United States Patent Office 3,243,423
Patented Mar. 29, 1966

3,243,423
PROCESS FOR THE PREPARATION OF PEPTIDES
Hugo Christiaan Beyerman, Wassenaar, Netherlands, assignor to Organon Inc., West Orange, N.J., a corporation of New Jersey
No Drawing. Filed Apr. 11, 1962, Ser. No. 186,653
Claims priority, application Netherlands, Apr. 20, 1961, 263,846
9 Claims. (Cl. 260—112.5)

The invention relates to the synthesis of peptides with one or more hydroxy amino acid residues from hydroxy amino acids and/or lower hydroxy peptides in which the hydroxyl function is temporarily protected.

The biologically active natural peptides contain various amino acid residues having a hydroxyl group. Frequently serine, threonine and tyrosine occur and less frequently 5-hydroxy-lysine and 4-hydroxy-proline.

It has been known that in the synthesis of peptides, i.e., in forming peptide bonds, the reactive groupings such as the —$NH_2$, —COOH and —SH groups are temporarily blocked or protected if their conversion must be avoided.

In the synthesis of peptides containing one or more residues of hydroxy amino acids it is advisable, in order to avoid side reactions such as the moving of an acyl group of a nitrogen to an oxygen atom, to protect the hydroxyl function temporarily by the introduction of an O-blocking group. A first requirement of such a protection is that introduction of such a group gives very good yields. Further the protection in the circumstances in which peptide bonds are formed must be continued and finally it must be possible to split off the said group after the synthesis without interruption of the peptide bonds. W. Grassman and E. Wünsch have given a survey of a number of O-protecting groups represented in L. Zechmeister, Progress in the Chemistry of Organic Natural Products, 13, 482–487 (1956), which have all of them their disadvantages, however, and are only very rarely used.

A new hydroxyl protection has been found now in the synthesis of peptides with one or more hydroxy amino acid residues in which the hydroxyl function is temporarily protected by conversion into the O-t.butyl ether group. In the formation of new peptide bonds this ether group remains firmly connected to the relative amino acid or peptide and can be easily split off again after the desired synthesis by means of an acid, preferably anhydrous trifluoro acetic acid, which peptide bonds can resist at room temperature.

Furthermore it has been found that in the present protection of the hydroxyl group the optical activity is completely maintained, so that no racemisation occurs. As the resulting yield of the reaction for the introduction of the O-t.butyl ether group and of that for the splitting off of this group are very high, it is evident that the present protection comes up to the requirements in every respect. Furthermore the O-t.butyl ether group is well capable of resisting hydrogenolysis and the influence of alkaline reacting substances.

In addition it has been found that the protecting O-t.butyl ether group can be introduced by the addition of the hydroxy amino acid or peptide to isobutene in the presence of a small amount of catalysing acid. In it an excess of isobutene is used. Reaction takes place as represented in the following scheme:

R—OH + $CH_2$=C($CH_3$)$_2$ → R—O—C($CH_3$)$_3$ in which R represents the residue of an N-acyl-hydroxy-amino-acid ester or an N-acyl-hydroxy-peptide ester.

Hence an amino acid or a peptide, the carboxyl group of which has already been converted as in the usual methyl or ethyl-ester group, can be used as starting material. It is useful, however, to use a non-esterified amino acid or peptide as starting material because during the action of an excess of isobutene there does not only occur etherification of the hydroxyl group, but at the same time also esterification to the t.butyl ester, as shown in the following scheme:

R—(OH)—COOH + 2$CH_2$=C($CH_3$)$_2$ →
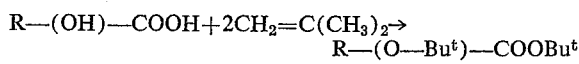

in which R represents the residue of an N-acyl-hydroxy-amino acid or peptide.

The reaction in which the O-protecting group is introduced is carried out in a solution or suspension of the N-acyl-hydroxy-amino acid or peptide in an inert organic solvent or liquid isobutene. As examples of very suitable organic solvents are mentioned: methylene chloride, chloroform, carbon tetrachloride, nitromethane and dioxane.

In order to obtain high yields a substantial excess of isobutene must be used and, if at the same time a carboxyl group must be esterified, a large excess of isobutene, preferably about a tenfold molar quantity for each hydroxyl and carboxyl group to be converted.

By preference the reaction is carried out in a pressure bottle at room temperature or lower temperatures. After about 6 to 10 hours the conversion at room temperature is complete. The yield of t.butyl ester of the N-acyl-O-t.butyl-amino acid or peptide obtained in this reaction is very good to practically quantitative.

After completion of the peptide synthesis, which may be carried out in the usual manner, the various protecting groups can be removed in any known manner to obtain the free peptide. The N-benzyloxy carbonyl group, which is preferably used, can be removed by, for example, hydrogenolysis.

The O-t.butyl ether group is split off by treating the ether with an acid in which the peptide bond is maintained. For that purpose both aqueous and anhydrous acids can be used, and the work is preferably done at room temperature or lower temperatures. The use of trifluoro acetic acid is preferred. As examples of aqueous acids are mentioned the inorganic acids, such as hydrochloric acid and sulphuric acid and as organic acid trichloroacetic acid. As anhydrous acids can be used hydrochloric acid and phosphoric acid. It is possible to split off simultaneously both the benzyloxy carbonyl group blocking the $NH_2$-function and the group blocking the —OH-function, namely by dissolving the protected peptide at room temperature or at lower temperatures in anhydrous trifluoro acetic acid to obtain yields over 80%.

Hereafter follow some examples of the preparation of O-t.butyl ethers of amino acids, namely, of L-serine, L-threonine and L-tyrosine and functional derivatives thereof, by which are meant the corresponding compounds in which functional groups are blocked, such as the N-acyl compounds, ammonium salts and esters. All these compounds are important materials for the synthesis of biologically active peptides. Finally examples are given of the synthesis of peptides using the O-protecting group according to the invention.

*Example I.—Serine*

(1) 2.30 g. of N-benzyloxycarbonyl-L-serine were suspended in 25 ml. of methylene chloride, whereupon 20 ml. of liquid isobutene were added. Next 0.1 ml. of concentrated sulphuric acid was added and the suspension shaken for one night in a pressure bottle at room temperature to obtain a clear solution which was left to stand at room temperature for an additional 24 hours. The excess of isobutene was removed by bubbling through a current of dried nitrogen. The resulting solution was then washed until neutral with a 5% sodium bicarbonate solution in water. After drying with sodium sulphate and evaporation of the solution a clear light yellow oil was obtained. Yield 3.1 g. (92%) of N-benzyloxy-carbonyl-O-t.butyl-L-serine t.butyl ester.

(2) Splitting off of the benzyloxycarbonyl group by hydrogenolysis: For that purpose the above-mentioned oil was shaken with hydrogen and a Pd/BaSO$_4$-catalyst till no more hydrogen was taken up. Next the catalyst was removed by centrifugation and the solvent distilled in vacuo to obtain 1.81 g. (81%) of O-t.butyl-L-serine t.butyl ester.

(3) 0.90 g. of the decarbobenzoxylated product was dissolved in a little dry ether, after which dried hydrogen chloride gas was bubbled through the solution. During this treatment a white substance crystallised, which was separated by filtration, dried at 60° C. and 0.1 mm. after crystallising once from a mixture of t.butyl alcohol/ether and finally analysed to obtain 0.90 g. of O-t.butyl-L-serine t.butyl ester hydrochloride; melting point 170° C. and $[\alpha]_D^{21}$ —6° (c.=1.15 in dimethyl formamide).

(4) Splitting off of the t.butyl groups: 0.90 g. of O-t.butyl-L-serine t.butyl ester were dissolved, while cooling, in 10 ml. of anhydrous trifluoro acetic acid. After standing overnight the solution was evaporated in vacuo. The oily residue was dissolved in a little water and chromatographed over a column of ion exchanger. The filtrate was evaporated in vacuo and the resulting crystalline residue recrystallised from an ethanol/water mixture. Yield after drying at 60° C. and 0.1 mm.: 0.35 g. (93%) of L-serine with melting point 218° C. (decomposition) and $[\alpha]_D^{21}$ +14.3° (c.=5.1 in 1 N hydrochloric acid).

*Example II.—Threonine*

(1) In the same manner as described in Example I 8.10 g. of N-benzyloxycarbonyl-L-threonine in methylene chloride was converted with isobutene. Yield 9.89 g. (86.5%) of N-benzyloxy-carbonyl-O-t.butyl-L-serine t.butyl ester in the form of a clear light yellow oil.

(2) By hydrogenolysis of the resulting amount of substance 5.40 g. (98%) of O-t.butyl-L-threonine t.butyl ester were obtained.

(3) By the method of Example I the hydrochloride of O-t.butyl-L-threonine t.butyl ester was obtained as an oily mass. From a solution thereof in water the picrate was prepared by adding an excess of sodium picrate. The resulting picrate of O-t.butyl-L-threonine t.butyl ester was crystallised from a mixture of t.butanol and water. Melting point 140° C. and $[\alpha]_D^{21}$ —6° (c.=2.1 in dimethyl formamide).

(4) Splitting off of the t.butyl groups: 0.56 g. of O-t.butyl-L-threonine t.butyl ester was dissolved in 9 ml. of trifluoro acetic acid in the same manner as described under serine. The L-threonine was isolated by treatment with an ion exchanger. Yield 248 mg. (86%). Melting point 255–260° C. (decomposition); $[\alpha]_D^{21}$ —31° (c.=1.3 in water).

*Example III.—Tyrosine*

(1) 3.15 g. of N-benzyloxycarbonyl-L-tyrosine were converted in methylene chloride with isobutene in the presence of a small amount of sulphuric acid (see Example I). After working up in the usual manner 4.01 g. (93.5%) of N-benzyloxycarbonyl-O-t.butyl ester were obtained in the form of a light yellow oil.

(2) By hydrogenolysis the benzyloxycarbonyl group was split off. Starting from 2.00 g. of substance 1.3 g. (about 100%) of O-t.butyl-L-tyrosine t.butyl ester were obtained.

(3) This compound was dissolved in ether. The ether was evaporated in vacuo and the resulting residue dissolved in benzene. By adding petroleum ether crystals were formed. After recrystallisation from a mixture of t.butanol and petroleum ether and drying at 60° C. and 0.1 mm. 1.21 g. (78%) of O-t.butyl-L-tyrosine t.butyl ester hydrochloride were obtained; melting point 154–155° C. and $[\alpha]_D^{21}$ +40° (c.=1.63 in dimethyl formamide).

(4) Splitting off of the t.butyl groups: 180 mg. of O-t.butyl-L-tyrosine t.butyl ester were dissolved, while cooling with water, in 3 ml. of anhydrous trifluoro acetic acid. After standing overnight at room temperature the trifluoro acetic acid was evaporated in vacuo and the resulting residue suspended in a little water. Next the suspension was adjusted at pH 6 with 0.1 N sodium hydroxide solution and the separated crystals recrystallised from an ethanol/water mixture to obtain 90 mg. (81%) L-tyrosine; melting point about 300° C. (decomposition) and $[\alpha]_D^{21}$ —8.5° (c.=4.0 in 6 N hydrochloric acid).

*Example IV.—Synthesis of L-asparaginyl-L-threonine*

(1) t.Butyl ester of N-benzyloxycarbonyl-L-asparaginyl-O-t.butyl-L-threonine: To a solution of 1.00 g. of t.butyl ester of O-t.butyl-L-threonine in 4 ml. of dimethyl formamide was added a solution of 2.0 g. of N-benzyloxycarbonyl-L-asparagine p-nitrophenyl ester in 4 ml. of dimethyl formamide. The yellow solution was left to stand at room temperature for 24 hours. By adding water an oily precipitate was obtained which was taken up in ethyl acetate. The resulting solution was shaken with water. Next the ethyl acetate solution was dried with sodium sulphate, after which the solvent was distilled under reduced pressure. The oily residue was dissolved in benzene. By adding petroleum ether a precipitate was formed of 2.0 g. (97%). After recrystallisation 1.9 g. of substance were obtained. Melting point 112–114° C. and $[\alpha]_D^{21}$ —2.3° (c.=2.60 in dimethyl formamide). The crystals were dried at room temperature and 0.1 mm. over P$_2$O$_5$ and analysed.

Found: C, 60.0; H, 7.8; N, 8.9. Calculated for C$_{24}$H$_{37}$N$_3$O$_7$ (479.58): C, 60.11; H, 7.78; N, 8.76.

(2) t.Butyl ester of L-asparaginyl-O-t.butyl-L-threonine. 500 g. of t.butyl ester of N-benzyloxycarbonyl-L-asparaginyl-O-t.butyl-threonine were decarbobenzoxylated in the usual manner by means of a Pd/BaSO$_4$ catalyst in hydrogen atmosphere. After removal of the catalyst and distillation of the solvent a crystalline product was obtained in a yield of 3.51 g. (98%) with melting point 145° C. The substance was crystallised from a mixture of ethanol and ether to which petroleum ether was added. The resulting crystals with melting point 149° C. and $[\alpha]_D^{21}$ +3° (c.=1.27 in dimethyl formamide) were analysed after drying at 60° C. and 0.1 mm.

Found: C, 35.5; H, 9.0; N, 12.1. Calculated for C$_{16}$H$_{31}$N$_3$O$_5$ (345.45): C, 35.63; H, 9.05; N, 12.16.

(3) L-asparaginyl-L-threonine: 200 mg. of t.butyl ester of L-asparaginyl-O-t.-butyl-L-threonine were dissolved at 0° C. in 5 ml. of trifluoro acetic acid. The solution was left to stand for one hour in the ice bath and after that for one hour at room temperature. The excess of trifluoro acetic acid was after that removed in vacuo and the resulting residue dissolved in a little water. Next the resulting solution was chromatographed over a column of ion exchanger. The filtrate was evaporated in vacuo and the resulting residue dried in high vacuum over P$_2$O$_5$. Yield of amorphous product 120 mg. (84%); melting point about 130° C., $[\alpha]_D^{21}$ —3° (c.=1.90 in water).

61 mg. of the amorphous product were dissolved in water and treated with an excess of picrolonic acid dissolved in water. After cooling and standing overnight in the refrigerator the resulting yellow crystals were filtered. After drying at 100° C. and 0.1 mm. 179 mg. of substance were obtained; melting point 200–202° C. (decomposition). Crystallisation from a mixture of ethanol and water did not change the melting point. $[\alpha]_D^{20}$ +7° (c.=2.24 in dimethyl formamide).

Found: C 42.3, H 4.9, N 19.1. Calculated for

(515.45): C 41.94, H 4.89, N 19.02.

The L-asparaginyl-L-threonine is the terminal dipeptide of the pancreas hormone, glucagon.

*Example V.—t.Butyl ester of N-phthaloyl-L-methionyl-L-asparaginyl-O-t.butyl-L-threonine*

(1) N-phthaloyl-L-methionyl: According to the process of G. H. L. Nefkens et al. (Rec. Trav. Chim., 79, 688 (1960)), this compound was prepared in a yield of 66%; melting point 125–126° C. and $[\alpha]_D^{21}$ —78.4° (c.=4.63 in dimethyl formamide).

(2) N.phthaloyl-L-methionine-p-nitrophenyl ester: By means of dicyclohexyl carbodiimide p-nitrophenol was converted with N-phthaloyl-L-methionine. Yield 81%. Melting point of the resulting substance 97–98° C.; $[\alpha]_D^{21}$ —89.8° (c.=2.36 in dimethyl formamide).

(3) 2.43 g. of t.butyl ester of L-asparaginyl-O-t.butyl-L-threonine and 3.20 g. of N.phthaloyl-L-methionine p-nitrophenyl ester were successively dissolved in 20 ml. of dimethyl formamide. After standing for 24 hours at room temperature the resulting mixture was processed in a known manner. As residue an oil was obtained from which after trituration with ether crystals were formed. Yield of the desired peptide 3.46 g. (81%). By crystallisation from a mixture of benzene and heptane crystals were obtained with melting point 165° C. and $[\alpha]_D^{21}$ —9.4° (c.=2.13 in dimethyl formamide). After drying at 60° C. and 0.1 mm. the crystals were analyzed.

Found: C 57.5, H 7.0, N 9.2. Calculated for $$C_{29}H_{42}N_4O_8S$$

(606.75): C 57.41, H 6.98, N 9.23.

The protecting t.-butyl groups are split off of this compound by the method described in the preceding example to obtain the N-phthaloyl-L-methionyl-L-asparaginyl-L-threonine, which after splitting off of the N-protecting group gives the terminal tripeptide, L-methionyl-L-asparaginyl-L-threonine of the glucagon.

I claim:

1. In the synthesis of peptides containing at least one hydroxyamino carboxylic acid group, the step which comprises temporarily etherifying the hydroxy group to form an O-tert.-butyl ether group therefrom with an excess of liquid isobutene in the presence of a catalytic amount of an acid.

2. In the synthesis of peptides containing at least one hydroxyamino carboxylic acid group, the steps of temporarily etherifying the hydroxy group to form an O-tert.-butyl ether group therefrom with an excess of liquid isobutene in the presence of a catalytic amount of an acid, and subsequently splitting off said ether group by treatment with an acid.

3. The method of claim 2 in which the acid employed to split off the ether group is anhydrous trifluoroacetic acid.

4. An O-tert.-butyl ether of a member selected from the group consisting of L-sterine, L-threonine, L-tyrosine, L-asparaginyl-L-threonine, L-methionyl-L-asparaginyl-L-threonine, and their N-acylates and esters.

5. An O-tert.-butyl ether of L-serine.

6. An O-tert.-butyl ether of L-threonine.

7. An O-tert.-butyl ether of L-tyrosine.

8. An O-tert.-butyl ether of L-asparaginyl-L-threonine.

9. An O-tert.-butyl ether of L-methionyl-L-asparaginyl-L-threonine.

References Cited by the Examiner

Grassman, Chem. Ber., vol. 91, page 538 (1958).
Iselin, Helv. Chim. Acta., vol. 39, page 57 (1956).
Wagner et al., Synthetic Organic Chemistry, pages 232–233 (1953).
Wunsch, Chem. Ber., vol. 91, page 542 (1958).

LEWIS GOTTS, *Primary Examiner.*

L. ZITVER, *Examiner.*

D. P. CLARKE, PERRY A. STITH, *Assistant Examiners.*